United States Patent
Mohamed

(10) Patent No.: US 10,465,650 B2
(45) Date of Patent: Nov. 5, 2019

(54) BUOYANT FORCE CONVERSION DEVICE AND METHOD

(71) Applicant: Imam Abdulrahman Bin Faisal University, Dammam (SA)

(72) Inventor: Mahmoud Mohamed Majzoub Mohamed, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/479,851

(22) Filed: Apr. 5, 2017

(65) Prior Publication Data
US 2018/0291866 A1 Oct. 11, 2018

(51) Int. Cl.
*F03B 17/02* (2006.01)
*F03B 17/04* (2006.01)

(52) U.S. Cl.
CPC ............ *F03B 17/025* (2013.01); *F03B 17/04* (2013.01); *F05B 2210/18* (2013.01); *F05B 2210/401* (2013.01); *Y02E 10/20* (2013.01); *Y10S 415/916* (2013.01)

(58) Field of Classification Search
CPC ........ F03B 17/025; F03B 17/04; F01D 15/10; Y10S 415/916
USPC .................................................. 290/52, 1 R
See application file for complete search history.

(56) References Cited

U.S. PATENT DOCUMENTS

| 3,466,866 A * | 9/1969 | Eschenfeld ............. F03B 17/04 60/496 |
| 2006/0216573 A1 * | 9/2006 | Pfister ..................... F23C 13/00 429/431 |
| 2007/0080540 A1 | 4/2007 | Tung |
| 2007/0284883 A1 * | 12/2007 | Cafariello ............... F03B 17/00 290/54 |
| 2008/0092535 A1 | 4/2008 | Razack |
| 2013/0167529 A1 * | 7/2013 | Camacho Munoz ........................ F03B 17/025 60/639 |
| 2014/0217733 A1 * | 8/2014 | Kroecker ............. F03B 13/186 290/53 |

FOREIGN PATENT DOCUMENTS

| CN | 102434375 B | 11/2013 | |
| KR | 10-2010-0006156 A | 1/2010 | |
| WO | WO-2012057637 A2 * | 5/2012 | ............... F03G 7/10 |

* cited by examiner

*Primary Examiner* — Charles Reid, Jr.
(74) *Attorney, Agent, or Firm* — Oblon, McClelland, Maier & Neustadt, L.L.P.

(57) ABSTRACT

An energy conversion device includes a container body configured to hold a liquid; a housing affixed above the container body by a handler connected to a surface of the container body, wherein a primary roller is configured to rotate at a first end of the housing and a free roller is configured to rotate at a second end of the housing; a piston attached at a first end to an outer perimeter of the primary roller; an inflatable balloon attached to a second end of the piston within the container body, wherein vertical movement of the piston causes the primary roller to rotate; an air chamber configured to supply air to a lower opening in the inflatable balloon via a balloon valve; and an interconnect located on a side of the free roller configured for connection to one of an energy-driven device or a turbine generator.

15 Claims, 13 Drawing Sheets

BUOYANT FORCE CONVERSION DEVICE AND METHOD

BACKGROUND

The world consumes large amounts of energy, and the world's energy needs are constantly rising. However, energy resources are limited and most resources, such as oil and coal have an environmental impact. Clean energy sources are desirable and necessary for maintenance and growth of society.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

One embodiment includes an energy conversion device having a container body configured to hold a liquid and a housing affixed above the container body by a handler connected to a surface of the container body. A primary roller is configured to rotate at a first end of the housing and a free roller is configured to rotate at a second end of the housing. The energy conversion device also includes a piston attached at a first end to an outer perimeter of the primary roller, wherein the piston is secured by a piston holder to allow vertical motion of the piston and restrict horizontal and rotational motion of the piston. The energy conversion device also includes an inflatable balloon attached to a second end of the piston within the container body. The inflatable balloon is configured to drive the piston in an upward direction in response to a buoyant force exerted on the inflatable balloon by the liquid. Vertical movement of the piston causes the primary roller to rotate. The energy conversion device also includes an air chamber attached to the container body, wherein the air chamber is configured to supply air to a lower opening in the inflatable balloon via a balloon valve connecting the air chamber to the lower opening in the inflatable balloon when the inflatable balloon is in a lowered position. The energy conversion device also includes an interconnect located on a side of the free roller configured for connection to one of an energy-driven device or a turbine generator.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of the features of the implementations described herein are shown and described in detail. It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Embodiments herein describe an energy conversion device and method based upon Archimedes' principle. When a balloon or other inflatable object is filled with a compressible gas and submerged in a liquid, it has a tendency to rise upwards through the liquid and reach atmospheric pressure, due to a buoyant force. This buoyant force can be captured and converted into kinetic energy, which can be converted into electricity.

Figure 1A:
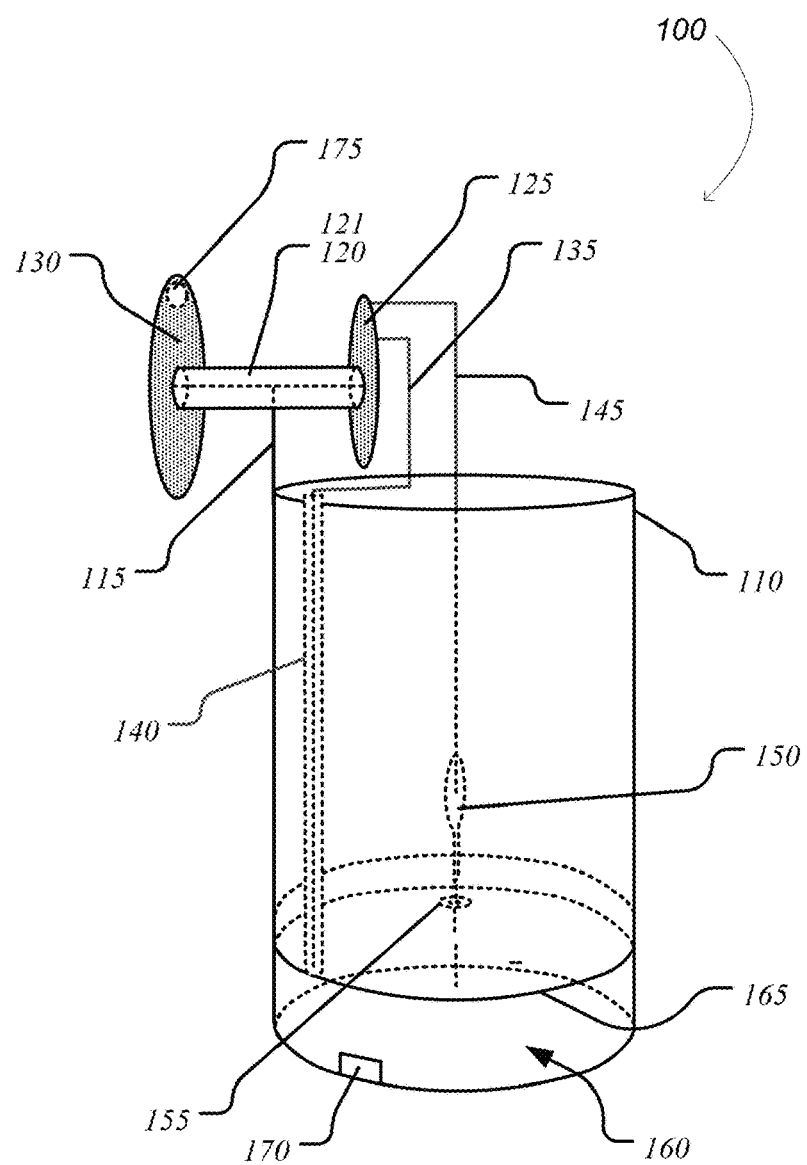
FIG. 1A illustrates an energy conversion device according to one embodiment.

FIG. 1A illustrates an energy conversion device 100, which converts a buoyant force created by operation of the energy conversion device 100 into kinetic energy. The kinetic energy is harvested and converted to electricity to power a multitude of energy-driven devices, such as recharging battery-operated devices or stations, message-displaying signs, lighting, and action figures, to name just a few.

Energy conversion device 100 includes a container body 110, which is a large reservoir configured to hold a liquid. FIG. 1A illustrates a cylindrical container body 110. However, other geometries for container body 110 are contemplated by embodiments described herein, such as a cube, a rectangular prism, a cone-shaped volume, or a pyramid-shaped volume.

Energy conversion device 100 also includes a handler 115, which is affixed at a first end to a surface of container body 110 and affixed at a second end to a housing 120 for a motion transformer 121 (out of view in FIG. 1A) contained within the housing 120. The motion transformer 121 is configured to rotate within the housing 120. The handler 115 holds the housing 120 in a stationary position above the container body 110.

A primary roller 125 is attached to a first end of the motion transformer 121 and a free roller 130 is attached to a second end of the motion transformer 121. In one embodiment, a diameter of the primary roller 125 is greater than a diameter of the free roller 130. For example, a diameter of the primary roller 125 can be 50% greater than a diameter of the free roller 130. The primary roller 125 and the free roller 130 are illustrated as solid discs. However, either roller can also have a spoked configuration. A mechanical advantage of the energy conversion device 100 can be calculated as a ratio of the radius of the primary roller 125 to the radius of the free roller 130. Therefore, a larger radius of the primary roller 125 compared to the free roller 130 leads to a more efficient energy conversion device 100. Calculations of the energy conversion device 100 are given in more detail herein.

Rotation of the primary roller 125 drives a rotation of the free roller 130, via the motion transformer 121. However, rotation of the free roller 130 can continue to rotate after the primary roller 125 is no longer rotating due to potential momentum from the previously-rotating primary roller 125. An analogous system of a primary roller and a free roller is a bicycle. A force is applied to a primary roller of the bicycle via two foot pedals, which move the bicycle forward. A chain connecting the free roller to the primary roller of the bicycle causes the free roller to rotate a rear tire to which the free roller is connected. The chain acts as a motion transformer. When the force is no longer applied to the primary roller, the free roller can still rotate if there is any remaining momentum within the free roller. This is commonly referred to as coasting. In one embodiment, the motion transformer 121 is a chain that connects the primary roller 125 to the free roller 130. However, other motion transformer configurations in which the primary roller 125 drives the free roller 130 are contemplated by embodiments described herein.

A pressure arm 135 of the energy conversion device 100 is attached at a first end to an outer perimeter of the solid disc primary roller 125. In an alternative embodiment, the first end of the pressure arm 135 is attached to a spoke of the primary roller 125 when the primary roller 125 has a spoked configuration, in lieu of a solid disc configuration. The pressure arm 135 is attached at a second end to a pressure arm extension 140. The pressure arm extension 140 runs longitudinally from an upper region to a lower region of the container body 110. The pressure arm extension 140 is held in a stationary horizontal position at its lower end, such that only vertical motion of the pressure arm extension 140 is permitted. The pressure arm 135 has a curved or bracketed shape between the first end attached to the primary roller 125 and the second end attached to the pressure arm extension 140. When the primary roller 125 rotates, the pressure arm 135 attached to the primary roller 125 also rotates in the same rotational pattern. For example, if the primary roller 125 rotates in a clockwise direction, the pressure arm 135 also rotates in a clockwise direction. This rotational pattern causes the pressure arm extension 140 to move up and down in a lateral motion relative to the container body 110.

A piston 145 of the energy conversion device 100 is attached at a first end to the outer perimeter of the primary roller 125 in close proximity to the first end of the pressure arm 135 attached to the primary roller 125. FIG. 1C illustrates the first end 145a of the piston 145 and the first end 135a of the pressure arm 135 attached to the primary roller 125. FIG. 1C is a side perspective view of primary roller 125. When an imaginary line 21 extends radially from a center 22 of the primary roller 125 to the edge of the primary roller 125, the first end 145a of the piston 145 is located on the imaginary line 21 at point 23. The first end 135a of the pressure arm 135 is located on the imaginary line 21 at point 24. Stated another way, the piston 145 is attached by its first end 145a to an inner circumferential point (point 23) located on the primary roller 125, while the pressure arm 135 is attached by its first end 135a to an outer circumferential point (point 24) located on the primary roller 125 when the piston 145 and the pressure arm 135 are positioned at a 180-degree location on the primary roller 125, as illustrated in FIG. 1C. The inner circumferential point and the outer circumferential point are located on the imaginary line 21 extending from the center 22 of the primary roller 125 to the edge of the primary roller 125.

The piston 145 is secured to allow vertical motion of the piston 145, but restrict horizontal and rotational motion of the piston 145. A securing mechanism for the piston 145 can be located within or outside of the container body 110. The securing mechanism can include a sleeve portion at a first end that surrounds the piston 145 to allow the piston 145 to move only in a vertical direction. The securing mechanism is stabilized and held stationary at an opposite second end. The piston 145 is the mechanism by which a driving force is applied to the primary roller 125, which is explained in more detail herein.

Figure 1B:
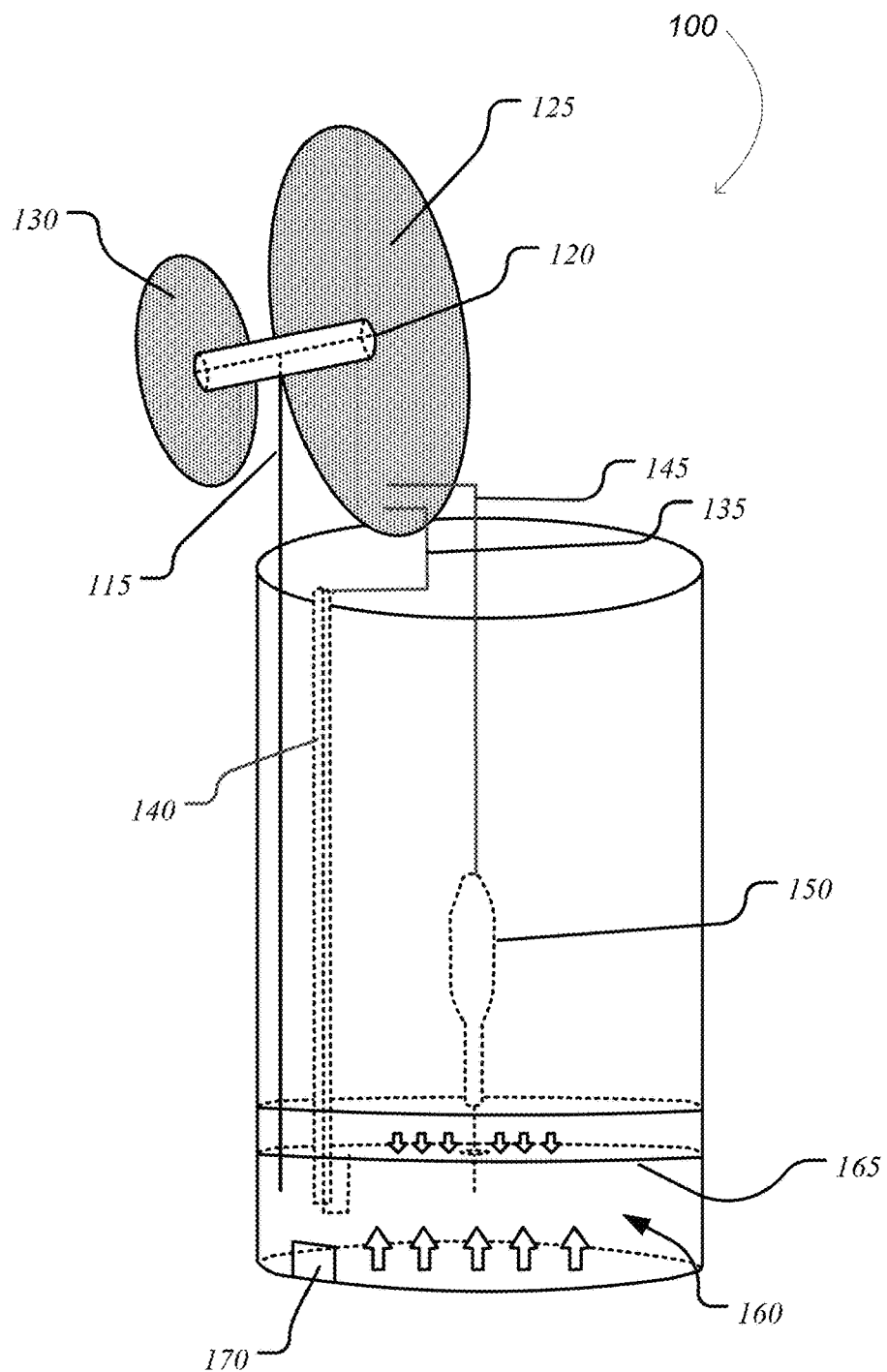
FIG. 1B illustrates the energy conversion device when a pressure arm and a piston are in a lowered position according to one embodiment.
Figure 1C:
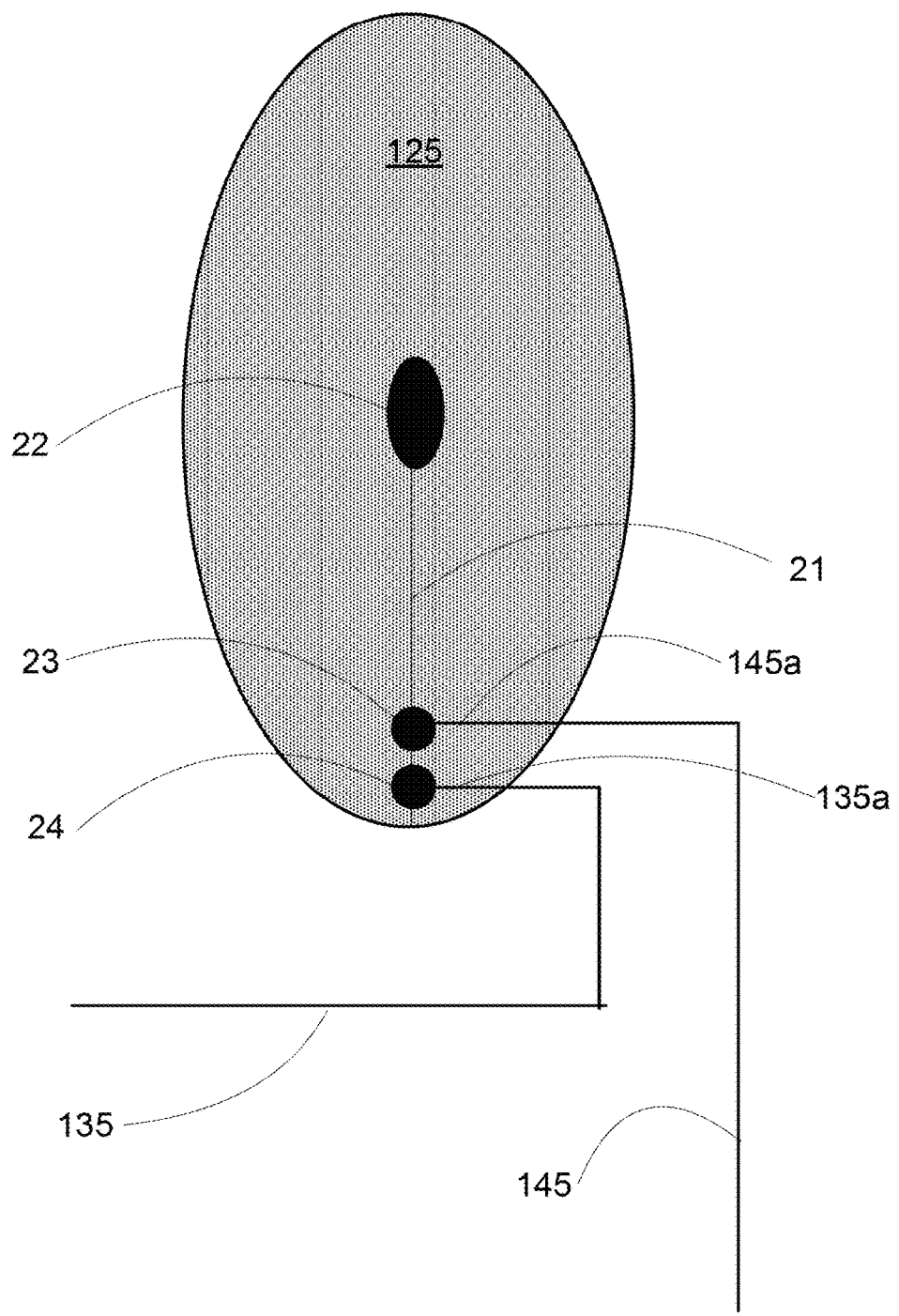
FIG. 1C illustrates attachment of the first end of the piston and the first end of the pressure arm to the primary roller according to one embodiment.
Figure 1D:
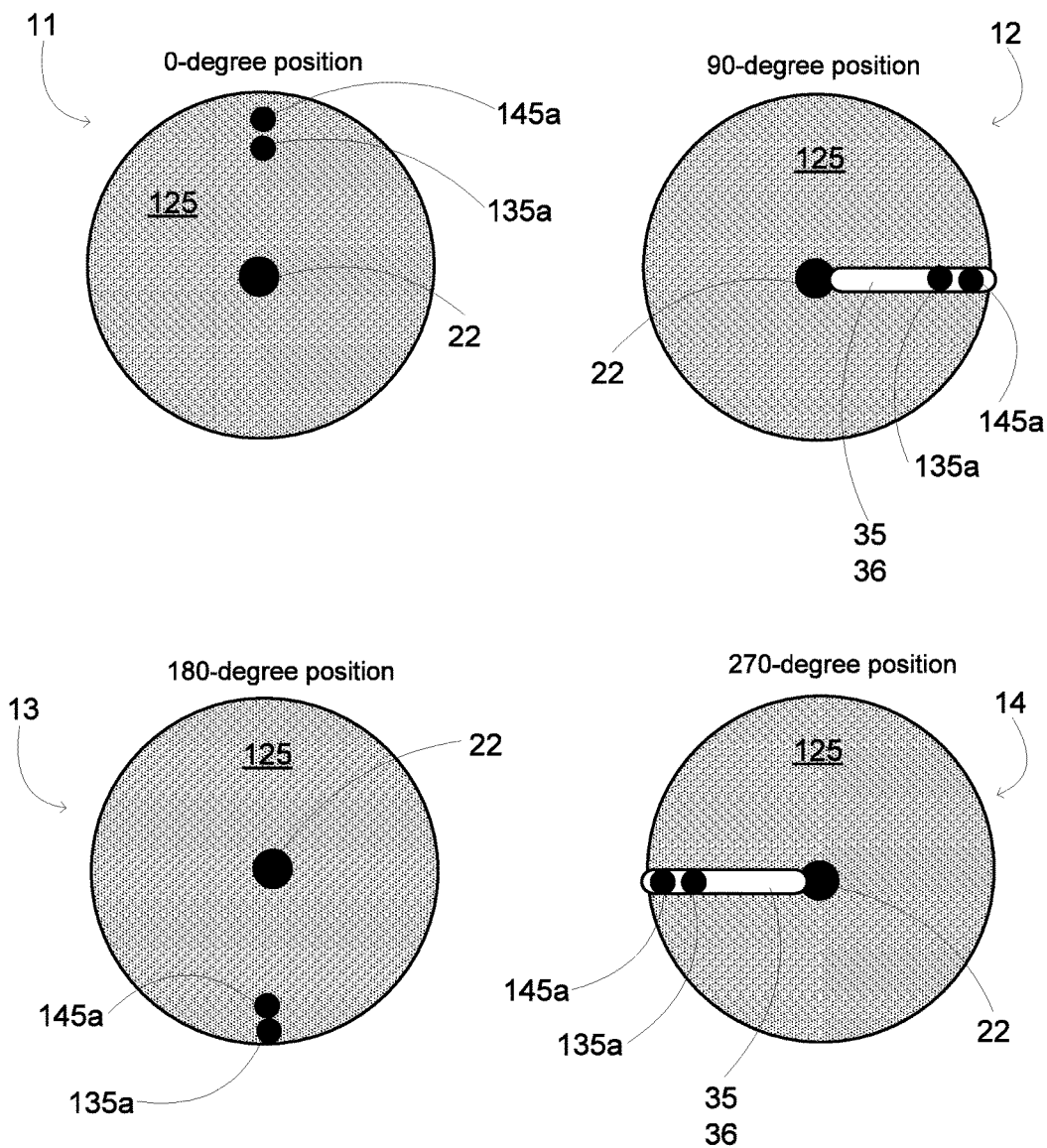
FIG. 1D illustrates a piston hinge assembly and a pressure arm hinge assembly during rotation of the primary roller according to one embodiment.

FIG. 1D illustrates a piston hinge assembly 35 and a pressure arm hinge assembly 36 on the primary roller 125. FIG. 1D is a direct face view of primary roller 125. Therefore, the piston hinge assembly 35 and the pressure arm hinge assembly 36 are directly atop one another and appear as a single hinge assembly.

A top left illustration 11 in FIG. 1D shows the first end 145a of the piston 145 and the first end 135a of the pressure arm 135 located at a zero-degree position (also illustrated in FIG. 1A). At the zero-degree position, the hinge assemblies 35 and 36 are in an unbent position because the first ends 145a and 135a are located vertically in line with the piston 145 and the pressure arm 135, respectively. The piston 145 and the pressure arm 135 are located in an upper vertical position.

As the primary roller 125 begins to rotate towards a ninety-degree position, the hinge assemblies 35 and 36 begin to bend towards the right and the hinge assemblies 35 and 36 also begin to extend. Extension of the hinge assemblies 35 and 36 can be achieved by a two-piece sliding mechanism. At a ninety-degree position, the hinge assemblies 35 and 36 are completely bent to the right and are also completely extended to reach the far right position on the primary roller 125, as shown in a top right illustration 12 in FIG. 1D.

A bottom left illustration 13 in FIG. 1D shows the first end 145a of the piston 145 and the first end 135a of the pressure arm 135 located at a 180-degree position (also illustrated in FIG. 1B). The hinge assemblies 35 and 36 are in an unbent position and the two-piece sliding mechanisms are completely compressed. The first ends 145a and 135a are located vertically in line with the piston 145 and the pressure arm 135, respectively. The piston 145 and the pressure arm 135 are located in a lower vertical position.

A bottom right illustration 14 in FIG. 1D shows the first end 145a of the piston 145 and the first end 135a of the pressure arm 135 located at a 270-degree position. The hinge assemblies 35 and 36 are completely bent to the left and are also completely extended to reach the far left position on the primary roller 125.

When the piston 145 and the pressure arm 135 are located at the zero-degree position (FIG. 1A) and the 180-degree position (FIG. 1B) on the primary roller 125, the hinge assembly 35 on the piston 145 and the hinge assembly 36 on the pressure arm 135 are positioned perpendicular to the surface of the primary roller 125. When the piston 145 and the pressure arm 135 are positioned at the 90-degree position and the 270-degree position on the primary roller 125, the hinge assembly 35 on the piston 145 and the hinge assembly 36 on the pressure arm 135 are fully extended and parallel to the surface of the primary roller 125.

An upper side of an inflatable balloon 150 of the energy conversion device 100 is attached to a lower free end of the piston 145. The inflatable balloon 150 moves up and down longitudinally in synchronized up and down movement with the pressure arm extension 140 as the primary roller 125 rotates. An opening in a lower side of the inflatable balloon 150 is configured to connect to a balloon valve 155 located at an inner bottom surface of the container body 110 when the pressure arm 135 is in a lowered position.

An air chamber 160 of the energy conversion device 100 is attached to an outer bottom surface of the container body 110. The air chamber 160 is configured to supply air to the lower opening in the inflatable balloon 150 via the balloon valve 155. The air chamber 160 can be supplied with air via a diaphragm 165 or via an air pump connected to the air chamber 160. Both mechanisms for supplying air to the air chamber 160 are described in more detail herein.

In a first embodiment, air moves into and out of the diaphragm 165 of the air chamber 160, via a reed valve 170 located at an entrance to the air chamber 160. The diaphragm 165 is configured to expand and compress upon entrance and exit, respectively of air or other compressible gas. Reed valve 170 is made of a pliable material, which opens inward into the air chamber 160 when the pressure within the air chamber 160 is lower than the atmospheric pressure outside of the energy conversion device 100. The reed valve 170 closes when pressure within the air chamber 160 is approximately equal to or greater than the atmospheric pressure.

Air or other compressible gas within the diaphragm 165 is forced from the diaphragm 165 into the inflatable balloon 150 by the upward and downward motion of the pressure arm extension 140. For example, as the pressure arm extension 140 moves from an upper position to a lowered position, the free end of the pressure arm extension 140 compresses the diaphragm 165 to force air or other compressible gas within the diaphragm into the inflatable balloon 150. As the pressure arm extension 140 moves vertically from the lowered position to the upper position, an amount of pressure applied by the pressure arm extension 140 is reduced, and an amount of air forced into the inflatable balloon 150 is reduced.

When the pressure arm extension 140 is in its lowest position, a tight seal is formed between the mouth of the inflatable balloon 150 and the balloon valve 155 by the mating of metallic material located near the opening of the inflatable balloon 150 and magnetic material surrounding an opening of the balloon valve 155. In an alternative embodiment, metallic material is present surrounding the opening of the balloon valve 155 and magnetic material is located near the opening of the inflatable balloon 150. The downward compression of the pressure arm extension 140 forces the balloon valve 155 to open, such that the inflatable balloon 150 is filled with air or other compressible gas exiting the pressurized diaphragm 165. Details regarding the mouth of the inflatable balloon 150 and the balloon valve 155 are described further herein.

When a predetermined amount of air or other compressible gas has filled the inflatable balloon 150, the buoyant force of the filled inflatable balloon 150 breaks the seal of the mouth of the inflatable balloon 150 and the balloon valve 155, separating the inflatable balloon 150 from the balloon valve 155, and causing the inflatable balloon 150 to rise upward through liquid contained within the container body 110. When the mouth of the inflatable balloon 150 is mated with the balloon valve 155, the piston 145 is positioned at the 180-degree position on the primary roller 125. The seal between the inflatable balloon 150 and the balloon valve 155 is broken when compressible gas within the inflatable balloon 150 reaches a predetermined volume or pressure, which causes the inflatable balloon 150 to rise within the fluid in the container body 110. This also causes the hinge assembly 35 and piston 145 on the primary roller 125 to rotate from the 180-degree position towards the 0-degree position. Rotation of the primary roller 125 causes rotation of the free roller 130. In one embodiment, the liquid is water. However, other liquids are contemplated by embodiments described herein, such as salt water or other liquids having a high buoyancy property.

In a second embodiment, air is supplied to the air chamber 160 via an air blower, which is connected by an air blower interconnect to the air chamber 160. Even though an air blower uses external energy to operate, the energy conversion device 100 efficiently produces energy orders of magnitude higher than the external energy supplied to the air blower. An example is given herein for illustrative purposes only.

An air blower having specifications of 12 volts (V), 15 amps (A), and 180 watts (W) consumes approximately 0.18 kilo watt hours (kwh). As a result, the air blower generates 0.658 kw per hour and consumes approximately 0.18 kw per hour, giving an efficiency of 33.33%.

Air has been illustrated as the compressible gas supplied to the air chamber 160 by an interconnected air blower. However, other compressible gases include helium or other gases having a high buoyancy property.

An interconnect 175 is located on an outside surface of the free roller 130. The interconnect 175 is configured to connect to an energy-driven device, such as recharging battery-operated devices or stations, message-displaying signs, lighting, and action figures. However, interconnect 175 is configured for connection to other energy-driven devices and is not limited to the examples given herein. In another embodiment, interconnect 175 is configured to connect to an electricity-conversion device, which can be used to power an energy-driven device. For example, the interconnect 175 can be connected to a shaft of a turbine generator, which is configured to produce electricity for an electricity-driven device.

FIG. 1B illustrates the energy conversion device 100 when the pressure arm 135 and the piston 145 are in a lowered position. In the lowered position, the pressure arm extension 140 applies a downward force against the diaphragm 165. The inflatable balloon 150 also mates with the balloon valve 155 in the lowered position. The applied downward force of the pressure arm extension 140 against the diaphragm 165 compresses the compressible gas within the diaphragm 165 and forces the compressible gas out through the balloon valve 155 and into the inflatable balloon 150. When the inflatable balloon 150 has been filled with compressible gas to a predetermined volume or pressure, the seal between the inflatable balloon 150 and the balloon valve 155 is broken. The inflated inflatable balloon 150 rises upward through the liquid within the container body 110, via a buoyant force.

Figure 2:
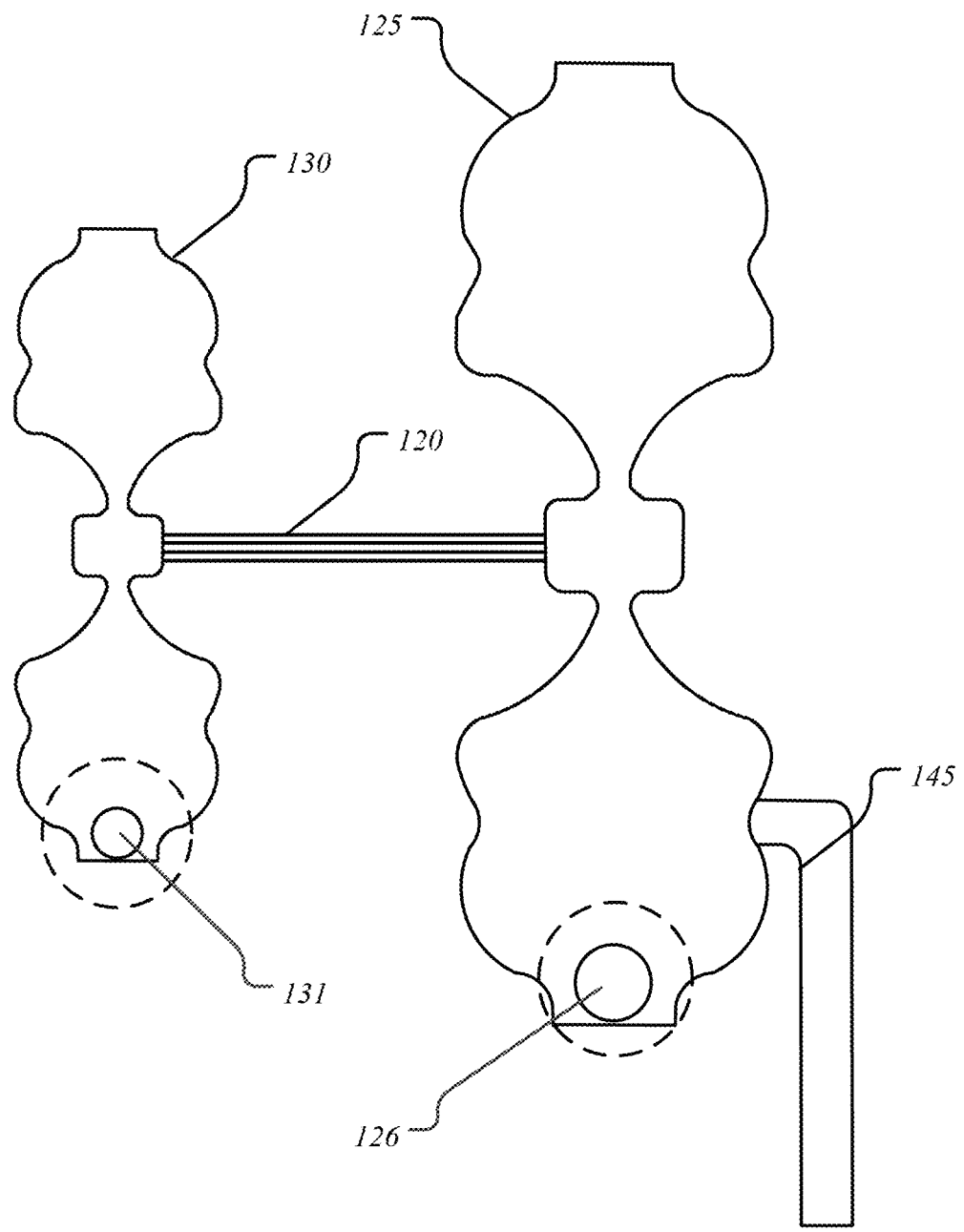
FIG. 2 illustrates a configuration of the primary roller and the free roller according to one embodiment.

FIG. 2 illustrates a configuration of the primary roller 125 and the free roller 130. A primary metal ball 126 is affixed to a perimeter of the primary roller 125. The primary metal ball 126 and the first end of the piston 145 are positioned along an imaginary line located from the center of the primary roller 125 to the perimeter of the primary roller 125. For example, both the first end 145*a* of the piston 145 and the primary metal ball 126 are located at the 180-degree position of the primary roller 125 in FIG. 2. The alignment of the first end 145*a* of the piston 145 along the imaginary line is also illustrated in FIG. 1C.

Since the primary metal ball 126 is located at the same rotational position as the first end 145*a* of the piston 145, the primary metal ball 126 decreases a rotation of the primary roller 125 when the first end 145*a* of the piston 145 is at its lowest point. Stated another way, the gravity exerted on the primary metal ball 126 will cause the primary metal ball 126 to rest at the lower 180-degree position, wherein the first end 145*a* of the piston 145 and the first end 135*a* of the pressure arm 135 are also at the 180-degree position on the primary roller 125.

When the first end 145*a* of the piston 145 and the first end 135*a* of the pressure arm 135 are located at the 180-degree position, the pressure arm extension 140 is pressed against the diaphragm 165 and the mouth of the inflatable balloon 150 is mated with the balloon valve 155. Each of the first end 135*a* of the pressure arm 135, the first end 145*a* of the piston 145, and the primary metal ball 126 are located at their lower 180-degree positions on the primary roller 125 at the same time.

When the piston 145 is at its lowest point, the inflatable balloon 150 is in a mated position with the balloon valve 155 and compressible gas from the air chamber 160 or diaphragm 165 fills the inflatable balloon 150. When the inflatable balloon 150 has been filled with a predetermined amount of compressible gas, the buoyant force of the compressible gas breaks the connection between the mouth of the inflatable balloon 150 and the balloon valve 155, and the inflatable balloon 150 begins to rise upwards through the fluid within the container body 110.

FIG. 2 also illustrates a free metal ball 131 affixed to a perimeter of the free roller 130. The mass of the free metal ball 131 increases a rotational force exerted upon the free roller 130 and thereby increases the momentum of the free roller 130. This provides an increased output of kinetic energy from the same input in buoyant force. Even when rotation of the primary roller 125 has subsided, rotation of the free roller 130 continues due to the increased momentum from the free metal ball 131.

Figure 3A:
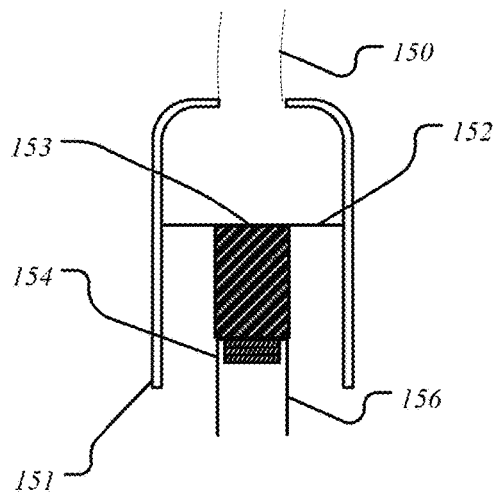
FIG. 3A illustrates an exemplary mouth of an inflatable balloon according to one embodiment.

FIG. 3A illustrates an exemplary mouth of the inflatable balloon 150. A plastic cup 151 forms an enlarged mouth which opens downward from the lower end of the inflatable balloon 150. A steel handler 152 sits atop a plastic spacer 153 inside the plastic cup 151. A magnet 154 is located between two steel bars 156 and below the plastic spacer 153.

Figure 3B:
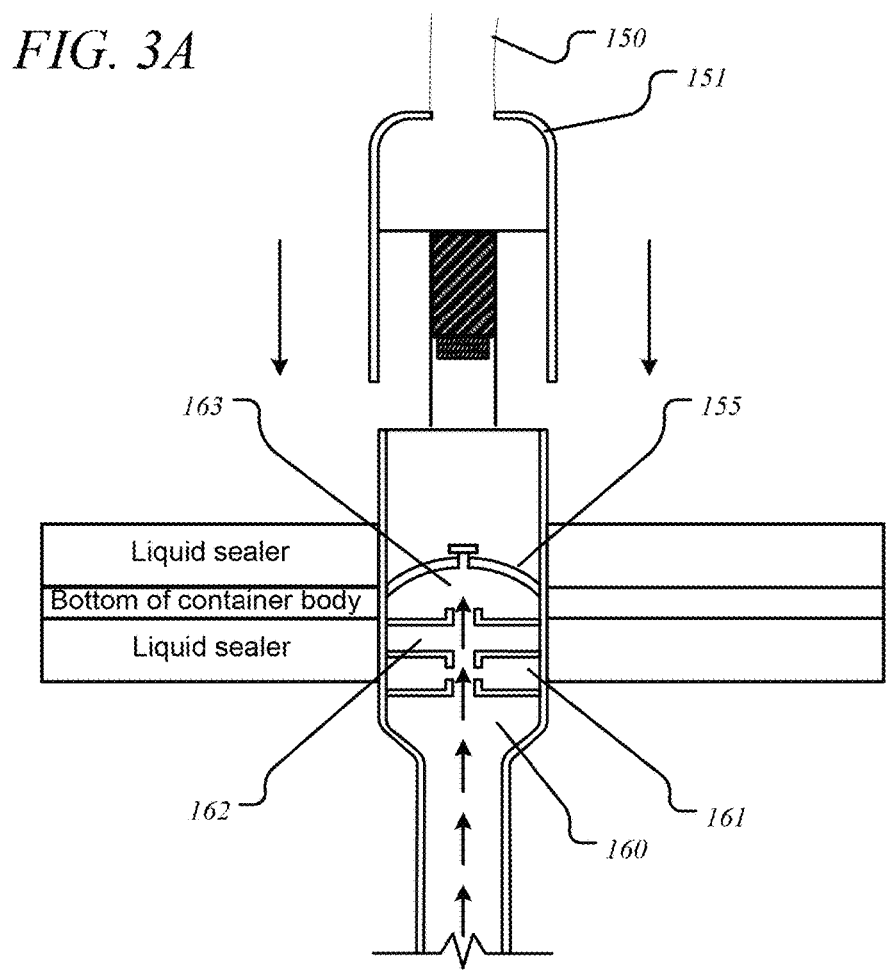
FIG. 3B illustrates a plastic cup aligned with a valve of an energy conversion device according to one embodiment.
Figure 3C:
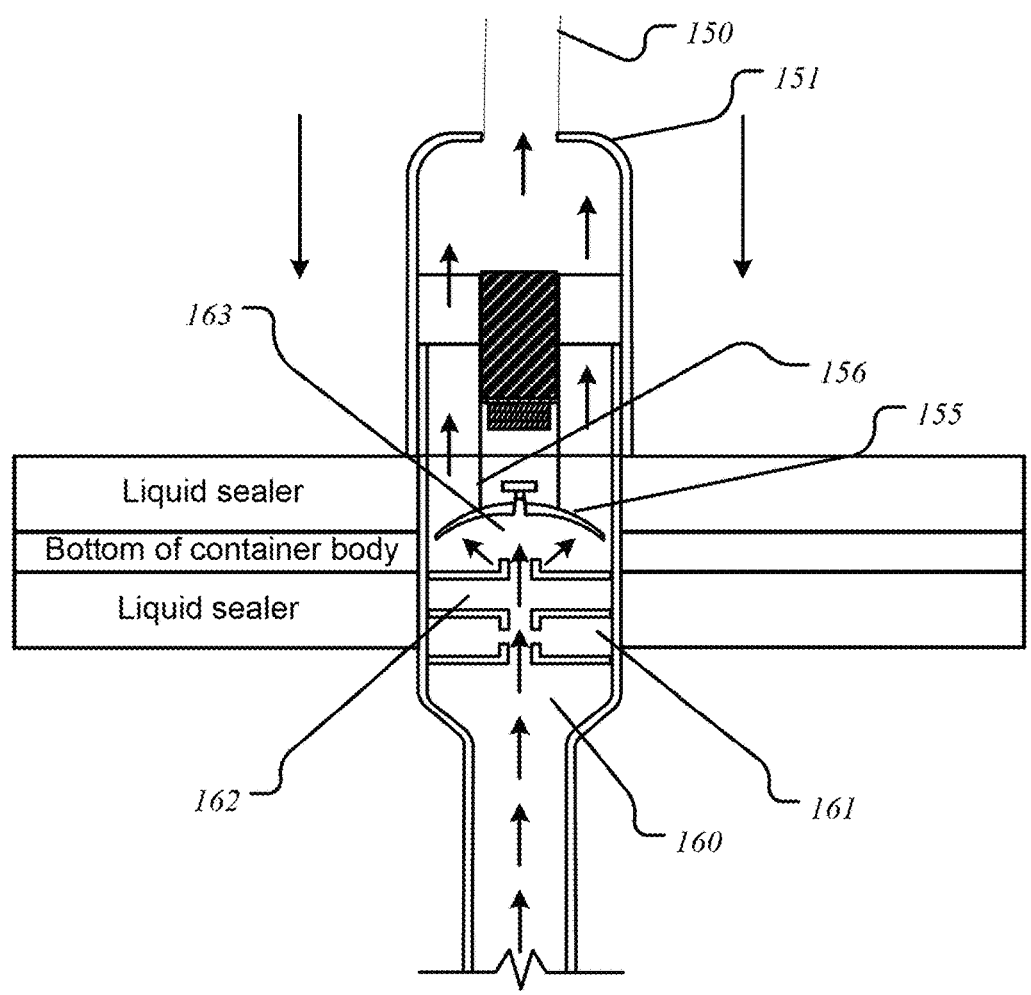
FIG. 3C illustrates a plastic cup of an inflatable balloon mated with a valve of an energy conversion device according to one embodiment.

FIGS. 3B and 3C illustrate implementations of the inflatable balloon 150 and the balloon valve 155. FIG. 3B illustrates the plastic cup 151 being aligned with the balloon valve 155. The downward vertical movement of the piston 145 assures alignment of the plastic cup 151 with the balloon valve 155.

FIG. 3C illustrates the plastic cup 151 of the inflatable balloon 150 mated with the balloon valve 155. The plastic cup 151 fits outside of the outer members of the balloon valve 155. The two steel bars 156 press against a perimeter of the balloon valve 155 as the inflatable balloon 150 moves in a downward direction in order to press the balloon valve 155 open. This pressing of the two steel bars 156 against the perimeter of the balloon valve 155 allows compressible gas to fill the inflatable balloon 150.

FIGS. 3B and 3C also illustrate multiple air sub-chambers of the air chamber 160. A first air sub-chamber 161 is located at a lower side of the air chamber 160. A first set of partitions partially blocks compressible gas flow from the first air sub-chamber 161 into a second air sub-chamber 162. A second set of partitions partially blocks the compressible gas flow from the second air sub-chamber 162 into a third air sub-chamber 163, which is directly below the balloon valve 155. The multiple air sub-chambers prevent the inflatable balloon 150 from inflating too quickly. The use of multiple partitioned air sub-chambers allow the inflatable balloon 150 to inflate at a slower rate and thereby avoid bursting the thin membrane layer of the inflatable balloon 150. FIGS. 3B and 3C illustrate three air sub-chambers. However, less than three or more than three air sub-chambers are contemplated by embodiments described herein.

Figure 4:
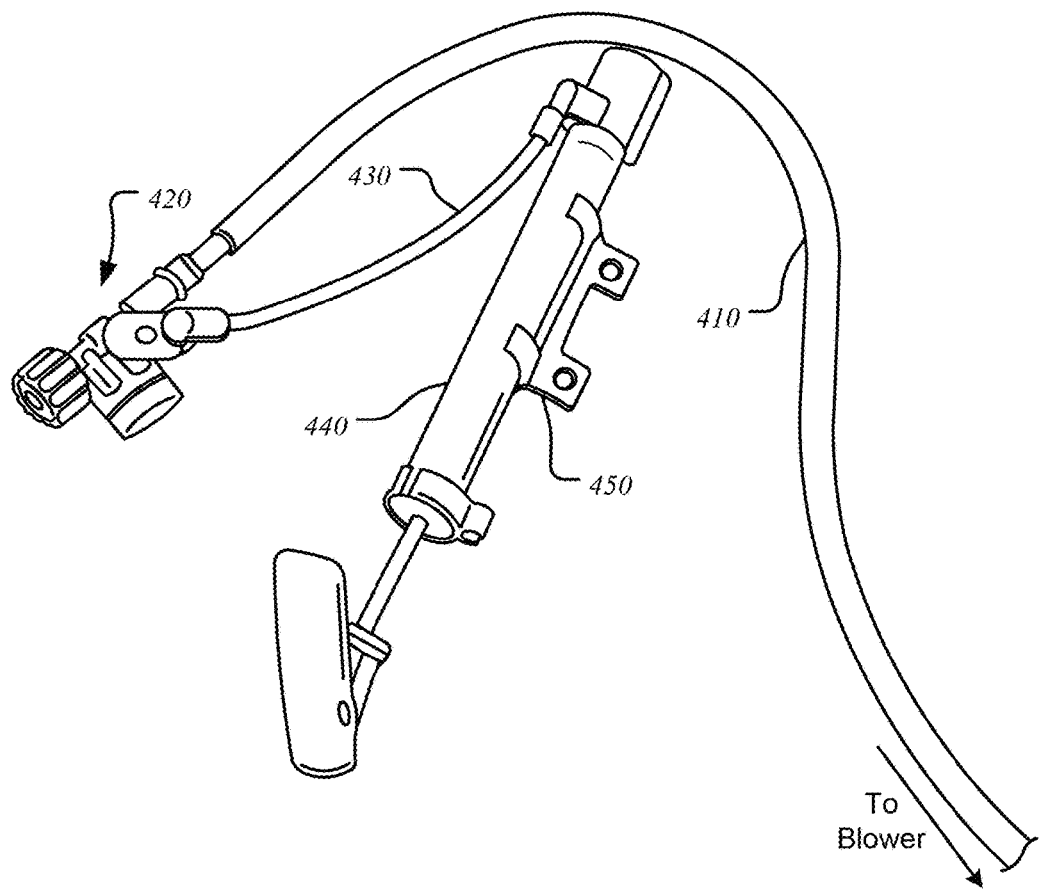
FIG. 4 illustrates components used with an air blower of an energy conversion device according to one embodiment.

FIG. 4 illustrates components used with an air blower that can supply air to the air chamber 160, according to one example. An air supply pipe 410 is configured to connect to an air blower, as illustrated in FIG. 4. The air supply pipe 410 is connected to a secondary valve 420. A secondary air supply pipe 430 forms a barrier 440 with an air dispenser 450. The barrier 440 prevents water or other fluid within the container body 110 from reaching the air blower. The dispenser 450 distributes air pressure from the air blower to multiple energy conversion devices 100. In one embodiment, an air blower capable of producing forty pounds per square inch (psi) can service eighty energy conversion devices 100 having inflatable balloons with a 0.5 psi capability.

In one embodiment, a return air pipe is used to return the compressed gas released from the inflatable balloon 150 when the inflatable balloon 150 is at an upper position within container body 110. The return air pipe is particularly useful for a compressed gas other than air.

Figure 5:
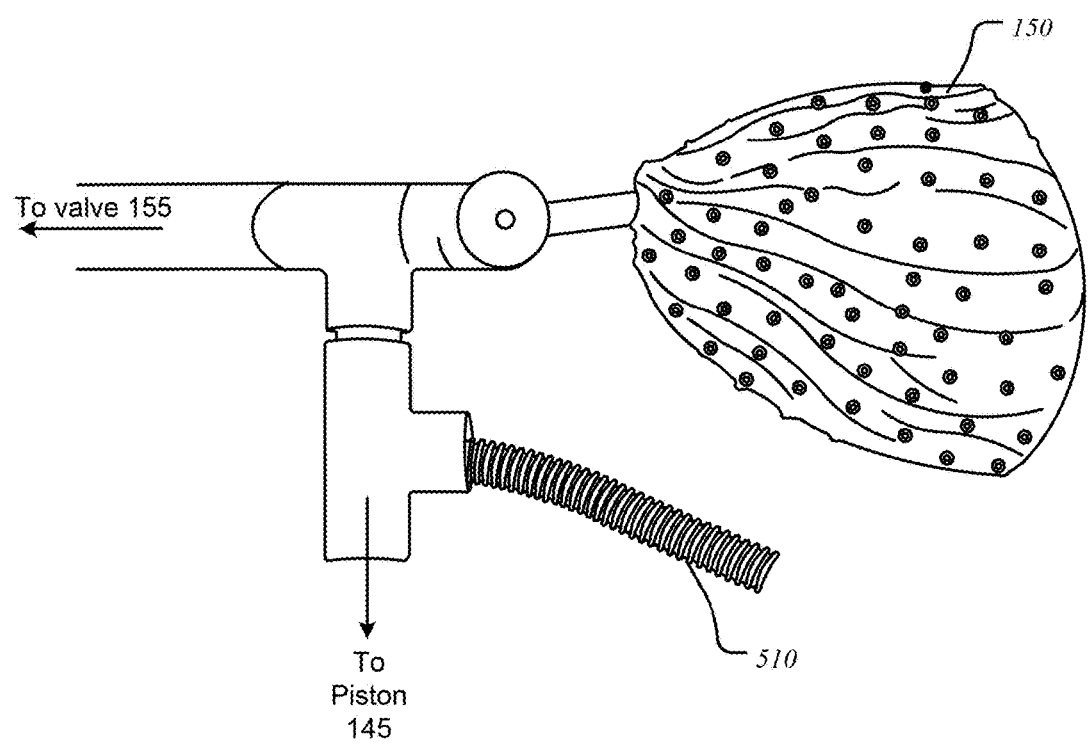
FIG. 5 illustrates an exemplary interconnection of a portion of an energy conversion device according to one embodiment.

FIG. 5 illustrates an exemplary interconnection of a portion of the energy conversion device 100. A return air pipe 510 returns the compressible gas to the air chamber 160 via the balloon valve 155 for recirculation. When the inflatable balloon 150 is located at an upper position, the opening of the inflatable balloon 150 is above the surface of the liquid within the container body 110. In an embodiment illustrated in FIG. 5, the expelled compressible gas is returned through the return air pipe 510 to the air chamber 160 for recirculation.

A description is given herein of an exemplary energy conversion device and corresponding calculations to illustrate the net kinetic energy realized from operation of the exemplary energy conversion device. The device dimensions and other components described are given for illustrative purposes only. Embodiments described herein are not limited to any of the particular device dimensions and/or component descriptions.

An exemplary energy conversion device has a container body height of 3 m. A height of the liquid is 2.7 m, and a volume of the liquid is $L\pi r^2 = 2.3 \times 0.5^2 \times \pi = 1.8$ m$^3$. A radius of the primary roller is 0.5 m, and a radius of the free roller is 0.3 m. A weight of the piston is 0.5 kg, and a length of the piston is 2.37 m. A length of the motion transformer is 0.98 m. A volume (v) of the balloon when it is full of compressed gas is $16.36 \times 10^{-3}$ m$^3$.

For the defined relationships of the exemplary energy conversion device given above, an equivalent force can be given as $$F = \rho v g = (1 \times 10^3 \text{ kg/m}^3)(16.36 \times 10^{-3} \text{ m}^3)(9.8 \text{ m/s}^2)$$
$$= 160.328 \text{ N}$$

The pressurized gas coming out of the balloon is potential energy, which transforms to kinetic energy when the balloon reaches the top of the container body. The potential energy is $$PE = F \times h = (160.328 \text{ N})(2.3 \text{ m}) = 368.7544 \text{ J}$$

If the water resistance is neglected, the amount of kinetic energy on the top of the container body can be determined. The velocity of the piston can be determined therefrom as $$KE = \tfrac{1}{2} m v^2$$

$$368.754 \text{ J} = \tfrac{1}{2}(0.5 \text{ kg}) v^2$$

Therefore, $v = 38.406$ m/s $= 138.261$ km/h

A relatively high velocity of the piston is illustrated, which represents the amount of energy invested from the buoyant force. The work accomplished by the piston is given as $$W = \Delta KE = 368.754 \text{ J}$$

An acceleration of the piston is given as $$A = F/m = 160.328 \text{ N}/0.5 \text{ kg} = 320.656 \text{ m/s}^2$$

Therefore, $t = 0.119$ s

The mechanical value of an engine can be represented by its moment and the amount of work accomplished by the engine. Therefore, the physical values produced by the free roller can be calculated. The velocity of the free roller is given as $$\omega = \theta/t = 2\pi/0.119 \text{ s} = 52.79 \text{ rad/s}$$

The moment of inertia is given as $$I = mr^2 = (0.5 \text{ kg})(0.5 \text{ m})^2 = 0.125 \text{ kg m}^2$$

The angular momentum of the free roller is given as $$L = I\omega = (0.125 \text{ kg m}^2)(52.79 \text{ rad/s}^2) = 6.598 \text{ kg m}^2 \text{ rad/s}^2$$

The moment due to rotation of the free roller is given as $$\iota = fr \sin \theta = (160.328 \text{ N})(2.37 \text{ m})(\sin 90) = 67.647 \text{ N m};$$

(where r is the piston length)

The angular acceleration of the free roller can be determined therefrom as $$\iota = I\alpha \rightarrow \alpha = \iota/I = (67.647 \text{ N m})/(0.125 \text{ kg m}^2) = 541.176 \text{ m/s}^2$$

The amount of kinetic energy obtained from the exemplary energy conversion device can be determined as $$KE = \tfrac{1}{2} I \omega^2 = \tfrac{1}{2}(0.125 \text{ kg m}^2)(52.79 \text{ rad/s})^2 = 174.174 \text{ J}$$
for each revolution The energy produced by the exemplary energy conversion device is 174 J in one revolution. However, in the previous calculations, the resistance forces, such as water resistance and roller resistance and other frictions due to motion were neglected. It is estimated that the total effect is not more than 10% of the total energy output. Therefore, an adjusted real energy output can be given as $$174.174 \text{ J} - 10\% \text{ KE} = 156.6 \text{ J for each revolution}$$

If the total amount of energy output is a minimum value of 156.6 J in one revolution, the amount of energy output in one hour is given as $$KE \times (3600 \text{ s})/(\text{time required for one revolution})$$
$$= 156.6 \text{ J} \times (3600 \text{ s})/(2 \times 0.119 \text{ s}) = 2.368 \times 10^6 \text{ J}$$

The amount of power output is given, wherein 1 Watt hour = 3600 J. Therefore, $$(2.368 \times 10^6 \text{ J})/3600 \text{ s} = 657.9832 \text{ Watt hours}$$

which can be given in terms of horse power as $$P_{(hp)} = P_{(kW)}/0.745699872 = 0.6579832/0.745699872 = 0.88237 \text{ hp}$$

which can be rounded to 0.882 hp

The mechanical advantage of the free roller can be calculated to determine a percentage of efficiency as Ideal mechanical advantage:

$$IMA = de/dr$$

where de is the radius of the primary roller and dr is the radius of the gear. Therefore $$IMA = de/dr = 0.5/0.05 = 10$$

A viscosity of a liquid is given as $$F/A = \mu \times d\mu/dy = 160.328 \text{ N}$$

An area of the piston at the attached surface is $2.37 \times 0.06 = 0.1422$ m$^2$ where $d\mu$ = a viscosity of the moving piston = 38.406 m/s and dy = a distance between a moving plate out of surface = 0.5 m The kinematic viscosity $(v) = \mu/\rho = 1 \times 10^{-6}$ m$^2$/s.

The dynamic viscosity (m Pa s) = $1 \rightarrow 0.001$ Pa s

As a result, the shear stress acting on the piston is given by $$\iota = \mu \times d\mu/dy = 0.001 \times 38.4/0.5 = 0.0768 \text{ N/m}^2$$

A pressure on the balloon when the balloon is at the bottom of the container body ready to be filled with compressible gas is given by $$PA + W = (P + \Delta P)A$$

$$PA + \rho g(A \times \Delta z) = PA + \Delta PA$$

$$\Delta PA = \rho g(A \times \Delta z)$$

$$\Delta P/\Delta z = \rho g \rightarrow dP/dZ = \rho g$$

Integrating both sides of ($dP/dZ = \rho g$) results in the following equation, given as $$P = \rho g z + C$$

Therefore, the pressure acting on the balloon at the bottom of the container body is given by $$P = \rho g z + P_{atm}$$

As a result, $$P = (10^3)(9.8)(2.3) + 101.325 \times 10^3 \text{ N/m}^2 \text{ wherein}$$

$$P = 22540 + 101.325 \times 10^3 = 123.865 \times 10^3 \text{ N/m}^2$$

The absolute pressure acting on the balloon at the bottom of the container body is equal to $123.865 \times 10^3$ N/m$^2$, or 22,540 N/m$^2$ gauge pressure Therefore, the pressure that needs to be within the air chamber to inflate the balloon is greater than 22,540 N/m².

A center of pressure and a center of gravity for the balloon can be determined as follows. A volume of an exemplary balloon is $=16.36 \times 10^{-3}$ m³

$4/3\pi r^3 = 16.36 \times 10^{-3}$ m³, where r is the balloon radius and is given by $$r = \sqrt[3]{\frac{16.36 \times 10^{-3}}{\frac{4}{3} \times \pi}} = 0.157 \text{ m}$$

The center of gravity of the balloon is given by $h_c = \frac{1}{2}r = \frac{1}{2} \times 0.157$ m $= 0.0785$ m $$h_P = \frac{I_G}{Ah_c} + h_C,$$

where $I_G$ is the moment of inertia $=\pi r^4/4 = \pi (0.1570 \text{ m})^4/4 = 4.77 \times 10^{-4}$ m⁴

The center of pressure of the balloon is given by $h_p = (4.77 \times 10^{-4})/(0.0785 + 0.154) + 0.0785 = 0.08$ m A hardware description of an exemplary computing device 600 used in accordance with embodiments herein is described with reference to FIG. 6. Computing device 600 can be used in conjunction with energy conversion device 100 for one or more automation processes, such as the timing for the primary roller 125, the piston 145, the inflatable balloon 150, the balloon valve 155, and the diaphragm 165 for the filling and expulsion of compressed gas of the inflatable balloon 150. A clock 631 controls a speed of the operation of the energy conversion device 100. The speed can be determined by a counter for the number of revolutions of the primary roller 125, for example. A switch 632 can be opened or closed to initiate or stop operation of the energy conversion device 100. Since operation of the piston 145, the inflatable balloon 150, the balloon valve 155, and the diaphragm 165 are interconnected directly or indirectly to the primary roller 125, the clock 631 needs to be connected only to the primary roller 125 or to another of the named devices.

Various sensors 633 can also be employed with computing device 600 for safety and maintenance reasons. For example, a pressure sensor can be used with the inflatable balloon 150, which is configured to operate within a predetermined pressure range. For a particular type and size of inflatable balloon 150, the pressure needs to be high enough to provide adequate buoyancy in traveling through the liquid to a position above the liquid in the container body 110. The pressure also needs to be low enough to avoid bursting or damaging the inflatable balloon 150.

A maintenance schedule can also be incorporated into the computing device 600, which can be displayed on the display 608 to alert a maintenance engineer of a needed service. Alerts can also be displayed on the display 608 for urgent or emergency conditions determined from the clock 631, the switch 632, and/or any one of the sensors 633.

Computing device 600 can also be used in conjunction with an air blower connected to the air chamber 160 for the filling and expulsion of compressed gas of the inflatable balloon 150. Computing device 600 can also be used in conjunction with interconnect 175, which can be directly connected to an energy-driven device, such as recharging battery-operated devices or stations, message-displaying signs, lighting, and action figures. Alternatively, interconnect 175 can be connected to an intermediate electricity conversion device, such as a turbine generator.

Computing device 600 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 600 includes a processor 601, a memory 602, a storage device 604, a high-speed interface 612 connecting to the memory 602 and multiple high-speed expansion ports 616, and a low-speed interface 610 connecting to a low-speed expansion port 614 and the storage device 604. Each of the processor 601, the memory 602, the storage device 604, the high-speed interface 612, the high-speed expansion ports 616, and the low-speed interface 610 are interconnected using various busses, such as communication bus 626, and may be mounted on a common motherboard or in other manners as appropriate.

The processor 601 can process instructions for execution within the computing device 600, including instructions stored in the memory 602 or on the storage device 604 to display graphical information for a GUI on an external input/output device, such as a display 608 coupled to the high-speed interface 612. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 602 stores information within the computing device 600. In some implementations, the memory 602 is a volatile memory unit or units. In some implementations, the memory 602 is a non-volatile memory unit or units. The memory 602 can also be another form of computer-readable medium, such as a magnetic or optical disk.

The storage device 604 is capable of providing mass storage for the computing device 600. In some implementations, the storage device 604 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 601), perform one or more methods, such as those described above. The instructions can also be stored by one or more storage devices, such as computer- or machine-readable mediums (for example, the memory 602, the storage device 604, or memory on the processor 601).

The high-speed interface 612 manages bandwidth-intensive operations for the computing device 600, while the low-speed interface 610 manages lower bandwidth-intensive operations. Such allocation of functions is an example only. In some implementations, the high-speed interface 612 is coupled to the memory 602, the display 608 (e.g., through a graphics processor or accelerator), and to the high-speed expansion ports 616, which may accept various expansion cards (not shown). In the implementation, the low-speed interface 610 is coupled to the storage device 604 and the low-speed expansion port 614. The low-speed expansion port 614, which can include various communication ports (e.g., USB, Bluetooth, Ethernet, wireless Ethernet) can be coupled to one or more input/output devices 618, such as a keyboard, a pointing device, a scanner, or a networking device such as a switch or router, e.g., through a network adapter.

The computing device 600 also includes a network controller 606, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Figure 6:
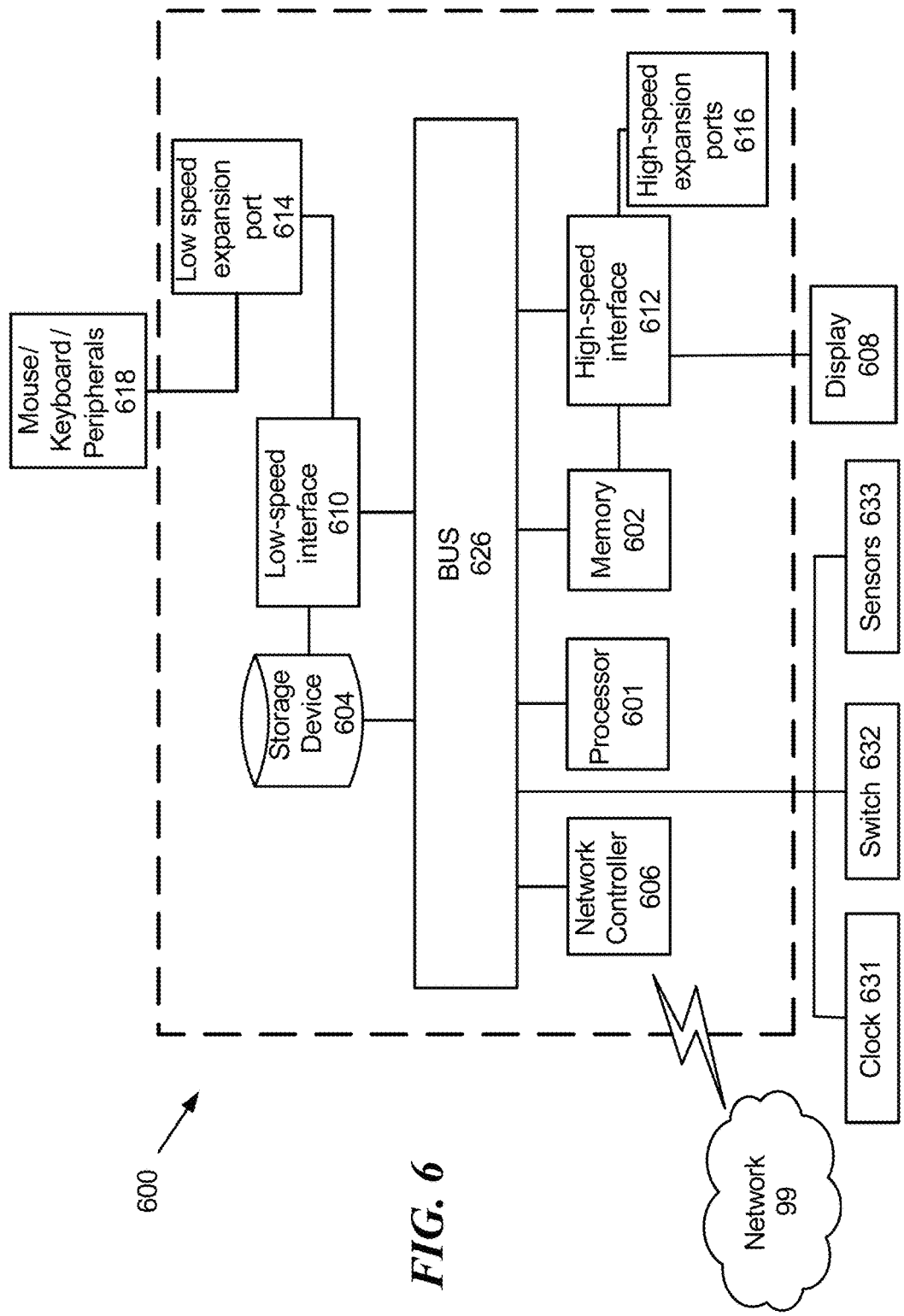
FIG. 6 is a block diagram of an exemplary computing system according to one embodiment.

Although the computing device 600 of FIG. 6 is described as having a storage medium device 604, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 608 (e.g., a CRT (cathode ray tube) or LCD (liquid crystal display) monitor) for displaying information to the user and a keyboard and a pointing device 618 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 7:
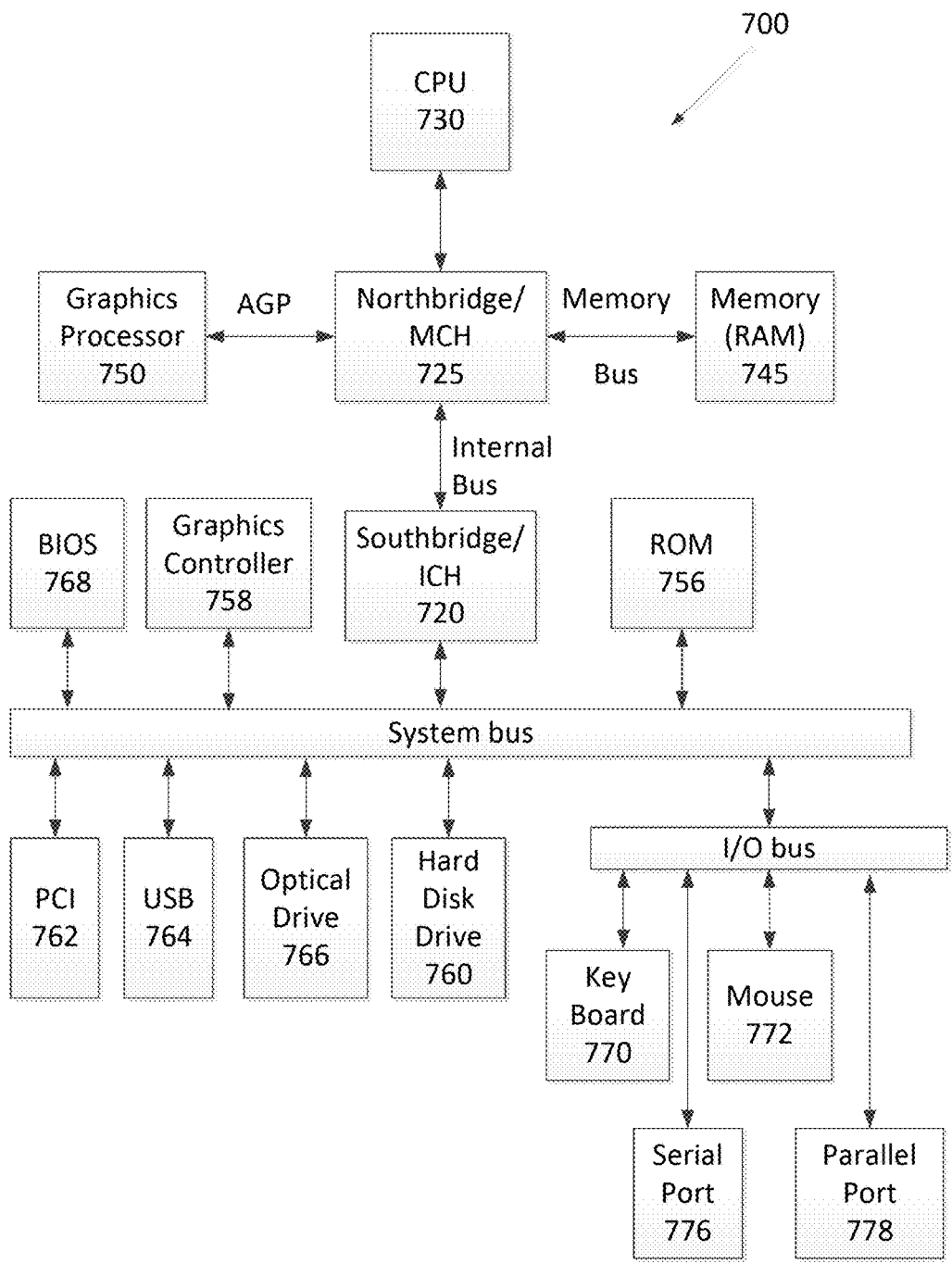
FIG. 7 is a schematic diagram of an exemplary data processing system according to one embodiment.

FIG. 7 shows a schematic diagram of an exemplary data processing system, according to aspects of the disclosure described herein for performing menu navigation, as described above. The data processing system is an example of a computer in which code or instructions implementing the processes of the illustrative embodiments can be located.

In FIG. 7, data processing system 700 employs an application architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU 730 can contain one or more processors and even can be implemented using one or more heterogeneous processor systems.

Figure 8:
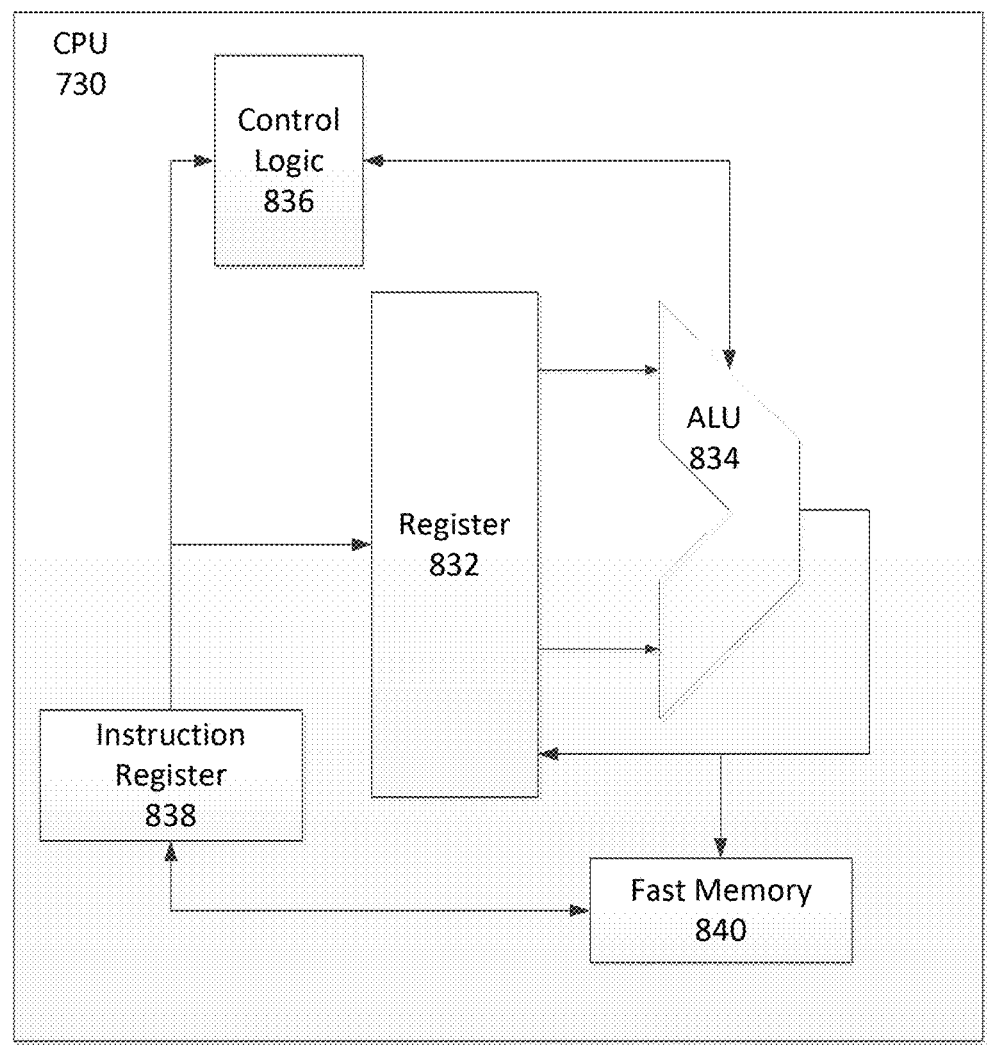
FIG. 8 is a block diagram of an exemplary CPU according to one embodiment.

For example, FIG. 8 illustrates one implementation of CPU 730. In one implementation, an instruction register 838 retrieves instructions from a fast memory 840. At least part of these instructions are fetched from an instruction register 838 by a control logic 836 and interpreted according to the instruction set architecture of the CPU 730. Part of the instructions can also be directed to a register 832. In one implementation the instructions are decoded according to a hardwired method, and in another implementation the instructions are decoded according to a microprogram that translates instructions into sets of CPU configuration signals that are applied sequentially over multiple clock pulses.

After fetching and decoding the instructions, the instructions are executed using an arithmetic logic unit (ALU) 834 that loads values from the register 832 and performs logical and mathematical operations on the loaded values according to the instructions. The results from these operations can be fed back into the register 832 and/or stored in a fast memory 840. According to aspects of the disclosure, the instruction set architecture of the CPU 730 can use a reduced instruction set computer (RISC), a complex instruction set computer (CISC), a vector processor architecture, or a very long instruction word (VLIW) architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 7, the data processing system 700 can include the SB/ICH 720 being coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices can include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Embodiments described herein can be implemented in conjunction with one or more of the devices described above with reference to FIGS. 6-8. Embodiments are a combination of hardware and software, and processing circuitry by which the software is implemented.

Figure 9:
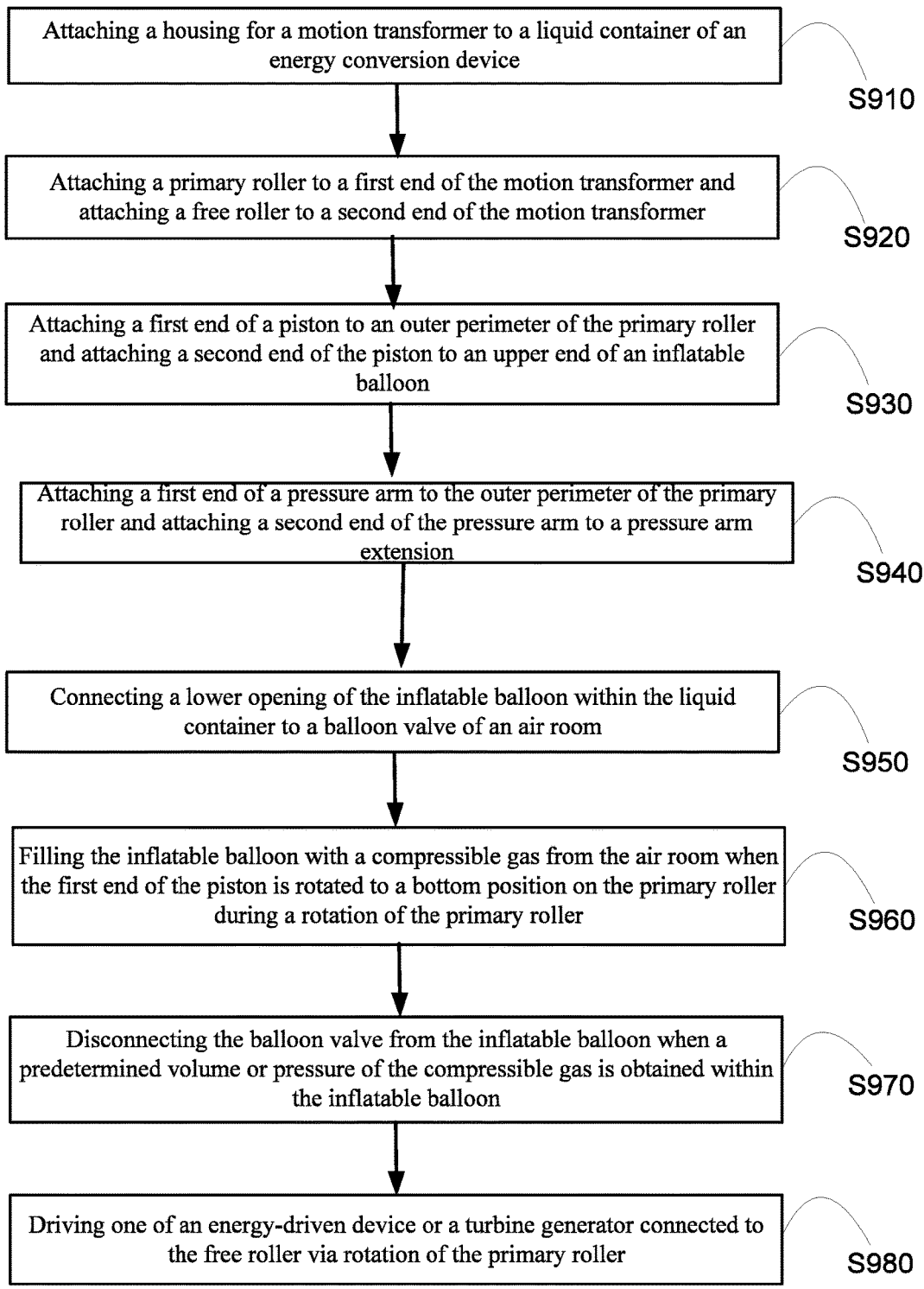
FIG. 9 is a flowchart for an exemplary method of according to one embodiment.

FIG. 9 is a flowchart for an exemplary method 900 of converting energy. In one embodiment, a buoyant force is converted to kinetic energy to drive one or more energy-driven devices connected to an energy conversion device, such as energy conversion device 100. In one embodiment, an interconnect connects the energy conversion device to a turbine generator, which provides electricity to the energy-driven device.

In step S910 of method 900, a housing for a motion transformer is attached to a liquid container of an energy conversion device. In one embodiment, the liquid container is cylindrical. However, other geometric shapes are contemplated by embodiments described herein, such as a cube, a rectangular prism, a cone-shaped volume, or a pyramid-shaped volume.

In step S920, a primary roller is attached to a first end of the motion transformer and a free roller is attached to a second end of the motion transformer. In one embodiment, the primary roller has a larger diameter than the free roller.

In step S930, a first end of a piston is attached to an outer perimeter of the primary roller and a second end of the piston is attached to an upper end of an inflatable balloon. The piston is secured at a lower portion to allow vertical motion of the piston, but restrict horizontal and rotational motion of the piston.

In step S940, a first end of a pressure arm is attached to the outer perimeter of the primary roller and a second end of the pressure arm is attached to a pressure arm extension. The pressure arm extension is held in a stationary horizontal position at its lower end, such that only vertical motion of the pressure arm extension is permitted.

In step S950, a lower opening of the inflatable balloon is connected within the liquid container to a balloon valve of an air chamber. The balloon valve is located at an inner bottom surface of the container body, which connects the lower opening of the inflatable balloon to the air chamber.

In step S960, the inflatable balloon is filled with a compressible gas from the air chamber when the first end of the piston and the first end of the pressure arm are rotated to a bottom position on the primary roller during a rotation of the primary roller. In one embodiment, the inflatable balloon has a metallic material located near the lower opening of the inflatable balloon. The metallic material is configured to mate with magnetic material on the balloon valve and open the balloon valve when the inflatable balloon is in a lowered position.

In step S970, the balloon valve is disconnected from the inflatable balloon when a predetermined volume or pressure of the compressible gas is obtained within the inflatable balloon. The buoyant force caused by the predetermined volume or pressure of the compressible gas is greater than the mated connection of the metallic material at the lower opening of the inflatable balloon and the magnetic material of the balloon valve.

In step S980, one of an energy-driven device or a turbine generator connected to the free roller is driven when the first end of the piston and the first end of the pressure arm are rotated to a top position of the primary roller during a via rotation of the primary roller. The buoyant force of the expelling compressible gas from the inflatable balloon is the driving force for the energy-driven device.

Embodiments described herein provide several advantages. Major resources for creating energy include oil and coal. However, resources are limited. In addition, energy production from oil and coal has environmental consequences. Embodiments described herein for an energy conversion device are cost effective, simple in operation, adaptable to many different environments, and environmentally clean.

In one embodiment, operation of the energy conversion device can be completely operated using Archimedes' principle. An air pressure difference induces higher pressure air from the environment into the diaphragm, and an air pressure difference induces higher pressure compressed air from the diaphragm into the inflatable balloon. This provides a source of electrical power without any electrical input. This can be used in many environments in which electricity is not present, such as disaster-hit areas, construction zones, and mobile structures.

In a second embodiment, an air blower can be connected to the air chamber. Even though electrical power input is required, the energy conversion device greatly amplifies the energy realized. For example, energy input of 40 psi from an air blower can propel eighty different energy conversion devices when the inflatable balloon pressure is 0.5 psi.

Embodiments described herein include the following aspects.

(1) An energy conversion device, includes a container body configured to hold a liquid; a housing affixed above the container body by a handler connected to a surface of the container body, wherein a primary roller is configured to rotate at a first end of the housing and a free roller is configured to rotate at a second end of the housing; a piston attached at a first end to an outer perimeter of the primary roller, wherein the piston is secured by a piston holder to allow vertical motion of the piston and restrict horizontal and rotational motion of the piston; an inflatable balloon attached to a second end of the piston within the container body, wherein the inflatable balloon is configured to drive the piston in an upward direction in response to a buoyant force exerted on the inflatable balloon by the liquid, wherein vertical movement of the piston causes the primary roller to rotate; an air chamber attached to the container body, wherein the air chamber is configured to supply air to a lower opening in the inflatable balloon via a balloon valve connecting the air chamber to the lower opening in the inflatable balloon when the inflatable balloon is in a lowered position; and an interconnect located on a side of the free roller configured for connection to one of an energy-driven device or a turbine generator.

(2) The energy conversion device of (1), wherein the air chamber includes a diaphragm configured to expand and compress upon entrance and exit of a compressible gas; a reed valve located at an entrance to the air chamber, wherein the reed valve is configured to open when a pressure within the diaphragm is lower than an atmospheric pressure outside of the energy conversion device and to close when the pressure within the diaphragm is approximately equal to or greater than the atmospheric pressure; and a diaphragm receptacle configured to receive a free end of the pressure arm extension and allow compression of the diaphragm when the pressure arm is in a lowered position.

(3) The energy conversion device of either one of (1) or (2), wherein the air chamber includes an air interconnect configured for connection to an air blower.

(4) The energy conversion device of any one of (1) through (3), wherein the inflatable balloon comprises a metallic material located near an opening of the inflatable balloon, the metallic material configured to mate with magnetic material of the balloon valve and open the balloon valve when the inflatable balloon is in a lowered position.

(5) The energy conversion device of any one of (1) through (4), wherein a diameter of the primary roller is greater than a diameter of the free roller.

(6) The energy conversion device of any one of (1) through (5), further includes a first metal ball fixed to the outer perimeter of the primary roller, wherein the first metal ball is configured to decrease a rate of rotation of the primary roller when the first end of the piston is in a lowered position.

(7) The energy conversion device of any one of (1) through (6), wherein each of the first metal ball, the first end of the piston, and the first end of the pressure arm are configured to simultaneously reside at a respective lowest position on the primary roller during rotation of the primary roller.

(8) The energy conversion device of any one of (1) through (7), further includes a second metal ball fixed to an outer perimeter of the free roller, wherein the second metal ball is configured to increase a rotational force exerted upon the free roller by the primary roller.

(9) The energy conversion device of any one of (1) through (8), wherein the second metal ball is configured to increase a momentum of the free roller when rotation of the primary roller has subsided.

(10) The energy conversion device of any one of (1) through (9), wherein the air chamber comprises a plurality of graduated air sub-chambers.

(11) The energy conversion device of any one of (1) through (10), wherein an opening of the balloon valve includes metallic material configured to mate with magnetic material located near an opening of the inflatable balloon when the inflatable balloon is in a lowered position.

(12) The energy conversion device of any one of (1) through (11), further includes a pressure arm attached at a first end to the outer perimeter of the primary roller and attached at a second end to a pressure arm extension, wherein a lower end of the pressure arm extension is configured to initiate compressed gas flow from the air chamber into the inflatable balloon when the first end of the pressure arm is in a bottom position on the primary roller during rotation of the primary roller.

(13) The energy conversion device of any one of (1) through (12), wherein the pressure arm extension is configured to move vertically as the primary roller rotates.

(14) The energy conversion device of any one of (1) through (13), further includes a motion transformer located within the housing, wherein rotation of the primary roller is configured to drive a rotation of the free roller, via the motion transformer.

(15) The energy conversion device of any one of (1) through (14), wherein the primary roller and the first end of the pressure arm rotate in sync, via a first hinge assembly.

(16) The energy conversion device of any one of (1) through (15), wherein the primary roller and the first end of the piston rotate in sync, via a second hinge assembly.

(17) An energy conversion device, includes means for affixing a housing to a container body of the energy conversion device; means for attaching a primary roller at a first end of the housing; means for attaching a free roller at a second end of the housing; means for attaching a pressure arm to the primary roller; means for attaching a piston to the primary roller; means for attaching an upper end of an inflatable balloon to a free end of the piston and connecting a lower end of the inflatable balloon to a balloon valve of an air chamber; means for inflating the inflatable balloon with a compressible gas when the pressure arm and the piston are located at a bottom position on the primary roller during a rotation of the primary roller; and means for driving one of an energy-driven device or a turbine generator connected to the free roller during expulsion of the compressible gas from the inflatable balloon.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. An energy conversion device, comprising:
    a container body configured to hold a liquid;
    a housing affixed above the container body by a handler connected to a surface of the container body, wherein a primary roller is configured to rotate at a first end of the housing and a free roller is configured to rotate at a second end of the housing;
    a piston attached at a first end to an outer perimeter of the primary roller, wherein the piston is secured to allow vertical motion of the piston and restrict horizontal and rotational motion of the piston;
    an inflatable balloon attached to a second end of the piston within the container body, wherein the inflatable balloon is configured to drive the piston in an upward direction in response to a buoyant force exerted on the inflatable balloon by the liquid, wherein vertical movement of the piston causes the primary roller to rotate and the inflatable balloon moves in a downward direction due to gravitational forces;
    an air chamber attached to the container body, wherein the air chamber is configured to supply air to a lower opening in the inflatable balloon via a balloon valve connecting the air chamber to the lower opening in the inflatable balloon when the inflatable balloon is in a lowered position; and
    an interconnect located on a side of the free roller.

2. The energy conversion device of claim 1, wherein the air chamber includes:
    a diaphragm configured to expand and compress upon entrance and exit of a compressible gas;
    a reed valve located at an entrance to the air chamber, wherein the reed valve is configured to open when a pressure within the diaphragm is lower than an atmospheric pressure outside of the energy conversion device and to close when the pressure within the diaphragm is approximately equal to or greater than the atmospheric pressure; and
    wherein a free end of a pressure arm extension allow compression of the diaphragm when a pressure arm is in a lowered position.

3. The energy conversion device of claim 1, wherein the inflatable balloon comprises a metallic material located near an opening of the inflatable balloon, the metallic material configured to mate with magnetic material of the balloon valve and open the balloon valve when the inflatable balloon is in a lowered position.

4. The energy conversion device of claim 1, wherein a diameter of the primary roller is greater than a diameter of the free roller.

5. The energy conversion device of claim 1, further comprising:
    a first metal ball fixed to the outer perimeter of the primary roller, wherein the first metal ball is configured to decrease a rate of rotation of the primary roller when the first end of the piston is in a lowered position.

6. The energy conversion device of claim 5, wherein each of the first metal ball, the first end of the piston, and the first end of the pressure arm are configured to simultaneously reside at a respective lowest position on the primary roller during rotation of the primary roller.

7. The energy conversion device of claim 1, further comprising:
    a second metal ball fixed to an outer perimeter of the free roller, wherein the second metal ball is configured to increase a rotational force exerted upon the free roller by the primary roller.

8. The energy conversion device of claim 7, wherein the second metal ball is configured to increase a momentum of the free roller when rotation of the primary roller has subsided.

9. The energy conversion device of claim 1, wherein the air chamber comprises a plurality of graduated air sub-chambers.

10. The energy conversion device of claim 1, wherein an opening of the balloon valve includes metallic material configured to mate with magnetic material located near an opening of the inflatable balloon when the inflatable balloon is in a lowered position.

11. The energy conversion device of claim 1, further comprising:
    a pressure arm attached at a first end to the outer perimeter of the primary roller and attached at a second end to a pressure alias extension, wherein a lower end of the pressure arm extension is configured to initiate a compressed gas flow from the air chamber into the inflatable balloon when the first end of the pressure arm is in a bottom position on the primary roller during rotation of the primary roller.

12. The energy conversion device of claim 11, wherein the pressure arras extension is configured to move vertically as the primary roller rotates.

13. The energy conversion device of claim 1, further comprising:
    a motion transformer located within the housing, wherein rotation of the primary roller is configured to drive a rotation of the free roller, via the motion transformer.

14. The energy conversion device of claim 1, wherein the primary roller and the first end of a pressure arm rotate in sync, via a first hinge assembly.

15. The energy conversion device of claim 1, wherein the primary roller and the first end of the piston rotate in sync, via a second hinge assembly.

* * * * *